Nov. 11, 1930.                A. S. WYSONG                1,781,207
                                 PISTON
                           Filed Oct. 2, 1929

Inventor:
Ancel S. Wysong
By Wm. O. Belt atty.

Patented Nov. 11, 1930

1,781,207

UNITED STATES PATENT OFFICE

ANSEL S. WYSONG, OF CHICAGO, ILLINOIS, ASSIGNOR OF ONE-HALF TO HARRY L. WELLS, OF CHICAGO, ILLINOIS

PISTON

Application filed October 2, 1929. Serial No. 396,810.

This invention relates to pistons and its object is primarily to prevent the piston rings from wearing the walls of the ring grooves in the piston or otherwise impairing the efficiency of the piston.

Another object of the invention is to provide a novel liner for the ring groove in a piston which can be easily assembled on the piston or cast in the piston.

And a further object of the invention is to provide the ring groove in a piston with a novel liner which is retained against outward movement radially of the piston but is capable of circumferential movement in the ring groove.

In the accompanying drawings I have illustrated the invention in a selected embodiment and referring thereto Fig. 1 is a vertical sectional view showing the invention embodied in a simple form of piston.

Figure 1:
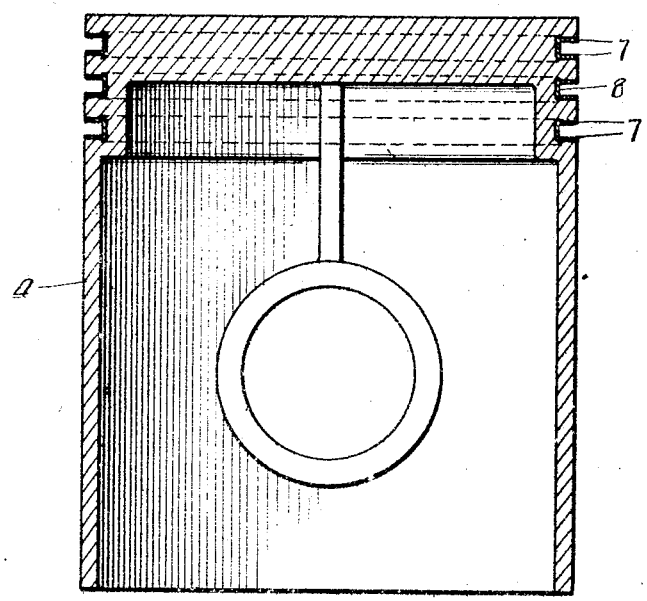
Figure 2:
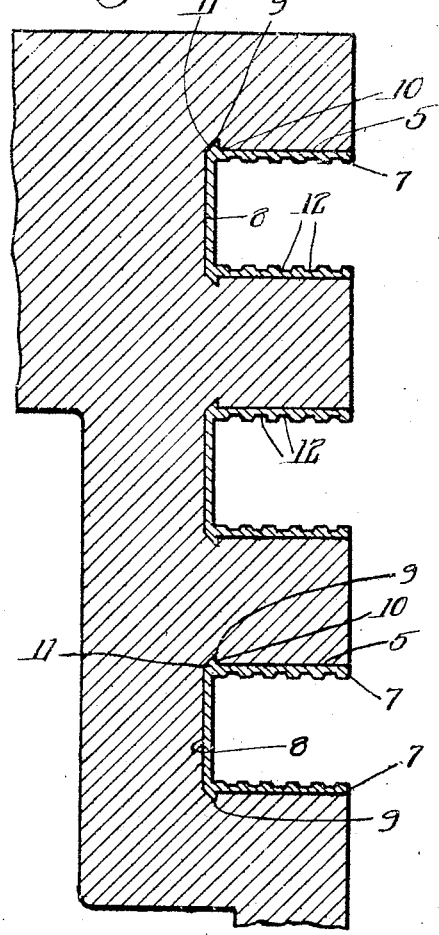
Fig. 2 is an enlarged detail sectional view.
Figure 3:
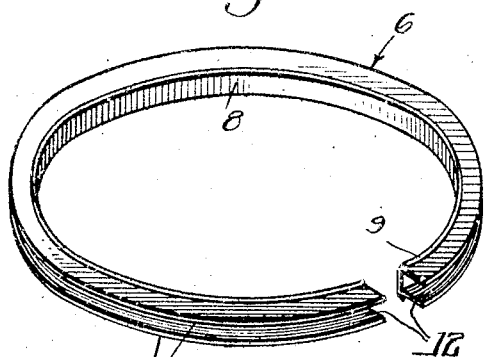
Fig. 3 is a perspective view of a liner.
Figure 4:
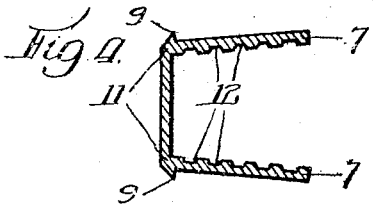
Fig. 4 is an enlarged detail sectional view of the liner.

The piston 4 may be of any construction and is shown in a simple form as representative of pistons generally to which the invention may be adapted. These pistons are provided with one or more annular grooves 5 to receive piston rings, not shown. This general construction and the function of the rings is so well known that further description is unnecessary. A groove liner 6 is made in the form of a divided ring of channel cross-section with parallel side walls 7 and a flat bottom wall 8. This liner has been made from sheet metal with dies by stamping but so far as the present invention is concerned it may be made in any way and by any means suitable for the purpose. The liner is provided exteriorly on its side walls 7 with ribs 9 which interlockingly engage the side walls of the ring groove in the body of the piston. These ribs are preferably, but not necessarily, located at or adjacent the bottom wall 8 of the liner and they are also preferably, but not necessarily, provided with a substantially flat face 10 and tapered face 11 forming a substantially tapered effect to take into and engage the walls of the groove. The flat face effectually prevents outward movement of the liner in the groove, but the tapered cross-section of the rib permits circumferential movement of all or a part of the liner in the groove, to compensate for variations in temperature. I prefer to make the liner of Monel metal and if the liner is inserted in the groove of an aluminum piston the piston should be heated to enlarge the groove to receive the liner and then when the piston cools the wall of the groove will contract and interlock with the ribs of the liner to secure the liner in the groove. If the piston is cast on the liner the ribs will be received in the walls of the groove as will be readily understood. The side walls of the liner are preferably flared slightly so that they will make close contact with the side walls of the groove under all heat conditions.

My invention provides a novel and efficient liner of simple construction for use in the ring groove of a piston to effectually prevent the ring from pounding and wearing the walls of the groove and rendering the operation of the piston inefficient or ineffective. The liner can be applied to pistons already made or it can be embedded in the piston in the casting operation. The liner is made of Monel or equivalent hard and wear-resisting metal of thin gauge and which will prolong the life of the piston and preserve its efficiency. The side walls of the liner may have plane inner faces but I consider it desirable to provide them with one or more annular oil grooves 12 which will be shallow in depth, of course, because of the relative thinness of the sides of the liner and can be made by a rolling operation.

I have illustrated the invention in a simple form suitable for the purpose, but I reserve the right to make all such changes in the form, construction and arrangement of parts as may be necessary or desirable to adapt the invention for different installations or assemblies within the scope of the following claims.

I claim:

1. A liner for a ring groove of a piston comprising a channel-shaped member adapted to fit within the groove, the side walls of the channel being flared so that they will be compressed when fitted in the groove to make close contact with the side walls of the groove.

2. A liner for a ring groove of a piston comprising a channel-shaped member adapted to fit within the groove, the side walls of the channel having annular oil grooves in their inner faces and being flared so that they will be compressed when fitted in the groove to make close contact with the side walls of the groove.

ANSEL S. WYSONG.